April 12, 1966   A. DOWLEY ET AL   3,245,130
MANUFACTURE OF POTTERY

Filed March 3, 1964   4 Sheets-Sheet 2

United States Patent Office 3,245,130
Patented Apr. 12, 1966

3,245,130
MANUFACTURE OF POTTERY
Arthur Dowley and Harold Roberts, Stoke-on-Trent, England, assignors to Service (Engineers) Limited, Stoke-on-Trent, England, a British company
Filed Mar. 3, 1964, Ser. No. 349,052
Claims priority, application Great Britain, Mar. 5, 1963, 8,641/63
9 Claims. (Cl. 25—24)

This invention is concerned with improvements in or relating to machines for use in the manufacture of pottery, more especially for use in the manufacture of articles of pottery flat-ware. The term "flat-ware" where used herein is to be understood as referring to plates, saucers and the like, as opposed to cups, bowls and the like which are customarily referred to as hollow-ware.

In the manufacture of flat-ware pottery articles, which in general are circular in outline and the peripheral margins of which are generally shaped so as to form part of a cone of large apical angle, the workpieces being thus concave on one side and convex on the other, it is customary, when performing certain operations upon such workpieces, for example an edge fettling and face towing operation, to support the workpieces by their peripheral margins on an annular rim of a work support with the concave face of the workpieces uppermost. In such cases it is desirable that the workpieces are accurately centered about the axis of the annular rim of the work support if consistently satisfactory results are to be obtained in the subsequent operation. It has, therefore, been proposed to provide work centering means comprising a plurality of (viz. four) arms arranged to engage a workpiece supported on a work support at spaced localities around its periphery whereby to urge it into a central position on the work support, the arms being actuated twice whereby to embrace the workpiece a first time, thus locating it generally centrally of the work support, and then, after having released it, to embrace the workpiece a second time, thus locating it accurately on the work support.

In carrying out operations in the manufacture of pottery flat-ware, for example an edge fettling and face towing operation, it is also customary to cause the work support to be rotated. In order to secure a workpiece on the work support during such rotation, suction is usually applied to the under-surface of the workpiece. It has generally been the case that suction is applied by means of a single suction cup disposed centrally of the work support. It has now been proposed, however, to apply suction by means of a plurality of suction cups located at spaced intervals along the annular rim of the work support, this being of particular advantage when it is desirable accurately to locate the periphery of the ware, for example in carrying out an edge fettling operation.

In carrying out a centering operation on a workpiece supported on a work support as referred to in the last paragraph above, however, it has been found that, especially in the case of large workpieces, for example dinner plates, when the workpiece is embraced by the arms of the work centering means and moved thereby into a central position, the workpiece is not caused to slide relative to the suction cups located along the rim of the work support, but rather the suction cups are merely distorted while retaining their engagement with the workpiece with the result that when the workpiece is released by the arms of the work centering means, the suction cups assume again their normal condition and at the same time return the workpiece supported on the work support to the position it had prior to the action of the arms of the work centering means thereon.

It is an object of the present invention to provide a machine for use in the manufacture of pottery ware having improved means whereby a workpiece placed upon a work support thereof can be accurately centered on the work support.

To illustrate the invention by way of example, there is hereinafter described a machine for use in performing a face towing and edge fettling operation on articles of pottery flat-ware (hereinafter referred to as a towing machine) comprising a turret arrangement carrying four rotatable work supports each of which is provided with an annular rim of flexible rubbery material along which are spaced a plurality of (viz. six) suction cups and against which the peripheral margin of a workpiece placed on the work support is arranged to bear under the influence of the suction cups, work centering means comprising four arms arranged to embrace a workpiece on one of the work supports by engagement with the workpiece at spaced localities around its periphery whereby to urge it into a central position on the work support, and suction applying means for applying suction to workpiece whereby to hold the workpieces firmly in their centered position on the work supports. The work centering means of the illustrative towing machine is located at a second of four stations through which the work supports pass as the turret arrangement is caused to rotate, the first, third and fourth stations of the machine being respectively loading, towing and unloading stations.

The illustrative towing machine also comprises a main cam shaft which effects one revolution for each cycle of operation of the machine and which is effective, once during each cycle of operation of the machine, (a) through a Geneva mechanism to cause the turret arrangement to rotate through 90° thereby to bring each work support to the next work station; (b) through a valve operating plate to cause suction to be applied to workpieces supported on the work supports whereby to hold the workpieces thereon while the turret arrangement is being caused to rotate as aforesaid; (c) through a first linkage system to cause the work centering means to be lowered, after the turret arrangement has been caused to rotate as aforesaid, whereby to bring the arms of the work centering means to an operating locality, and to be raised prior to the turret arrangement being caused again to rotate; (d) through a second linkage system to cause each arm of the work centering means to pivot about the axis of a spindle on which it is supported, when the arms are at the operating locality, whereby to bring them into engagement with the periphery of a workpiece supported on the work support, the arrangement being such that the arms embrace the workpiece thus supported, release it and embrace it again; (e) through a belt drive to cause a vertical drive shaft to rotate through one revolution for each cycle of operation of the illustrative machine, the axis of the drive shaft being coincident with the axis of the spindle of the work support at the work centering station of the machine and the drive shaft carrying at an upper end portion thereof a clutch plate capable of co-operating with a clutch plate mounted on a lower end portion of a spindle of each work support; and (f) through a third linkage system to cause the vertical drive shaft to be raised, when the arms of the work centering means embrace a workpiece supported on the work support for the second time, whereby to cause the work support to be turned through about 60°.

In the operation of the illustrative towing machine the operator loads a workpiece, e.g. a plate, on to a work support at the loading station of the machine and the turret arrangement is then caused to rotate to bring the workpiece to the work centering station, the work centering means then being lowered to bring the arms thereof to the operating locality. The arms of the work centering means are thereafter caused to embrace the workpiece a first time whereby roughly to center the workpiece, especially if little care has been taken in the initial loading thereof, and then to embrace it a second time, the work support being at the same time caused to rotate with the result that the suction cups are caused to be deformed in the direction of rotation of the work support and any distortion of the suction cups transversely of the direction of rotation of the work support previously caused by moving the plate under the action of the centering arms is relieved. When rotation of the work support stops and the arms again release the workpiece, the suction cups are allowed to assume again their normal condition thereby causing the workpiece to rotate slightly in a reverse direction but retaining the workpiece in its centralised position. It will thus be seen that any residual distortion of the suction cups which is caused by the action of the work centering arms and which would tend to displace the workpiece from its centralised position upon release by the arms is relieved.

Whereas the machine now to be described is one which performs an edge fettling and face towing operation, it will be realised that the fettling and towing devices at the third station could be substituted by a device for carrying out another operation if desired, for example a device for printing a decorative design on the workpieces.

There now follows a detailed description, to be read with reference to the accompanying drawings, of the illustrative towing machine. It will, of course, be realised that this machine has been selected for description by way of example and not by way of limitation of the invention.

Figure 1:
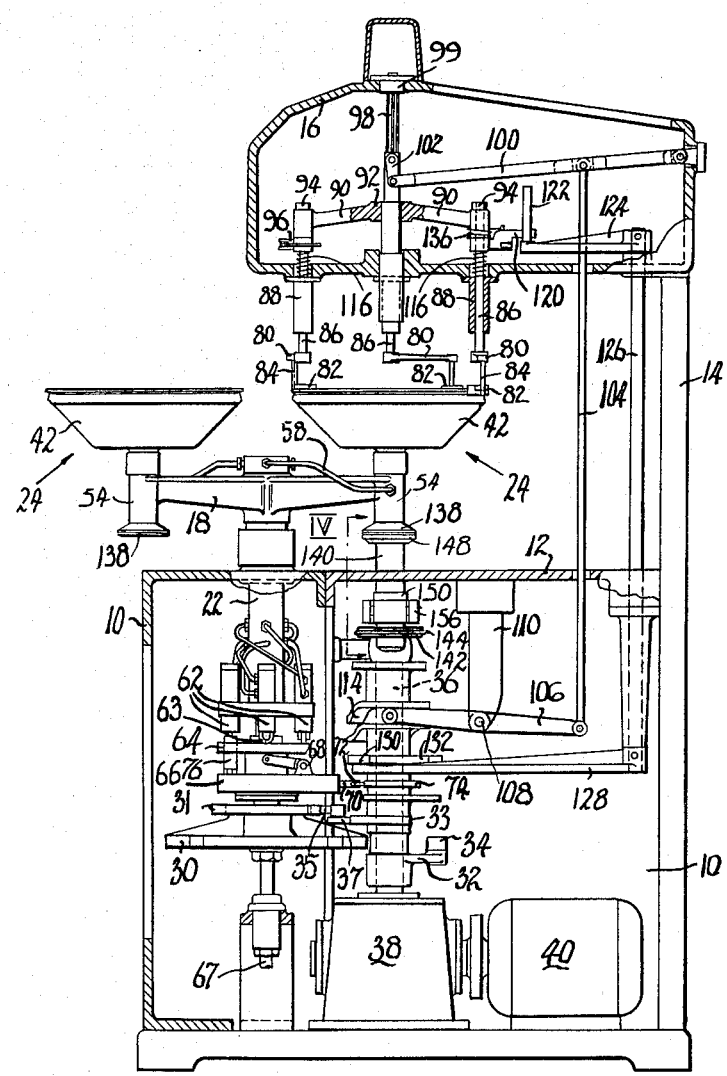
FIGURE 1 shows a view in right-hand side elevation and partly in section of the illustrative towing machine.

The illustrative towing machine comprises a housing 10 (FIGURE 1) that stands on the floor and has a flat top 12, an upstanding rear wall 14 and a head 16 which overhangs the top 12 of the housing. A turret 18 is mounted in bearings in the housing 10 for rotation about a vertical axis; the turret 18 has four arms 20 (FIGURE 2) and a vertical shaft 22 (FIGURES 1 and 3). Each arm 20 carries a work support 24 which is free to rotate about a central vertical axis of the support. The turret 18 is rotated anticlockwise (viewing FIGURE 2) step-by-step in the operation of the machine, and in a rest position two of the work supports are exposed in foremost stations so that an operator can readily remove a workpiece from the left-hand and place a fresh workpiece on the right-hand one while at a rearmost right-hand work-centering station 26 a workpiece is being accurately positioned centrally on its work support and at the rearmost left-hand work station 28 a workpiece is being operated upon.

The turret 18 is driven step-by-step by means of a Geneva mechanism comprising a Geneva wheel 30 secured to the shaft 22 and an arm 32, carrying a roll 34 to engage the slots in the wheel 30, said arm 32 being mounted on a vertical cam shaft 36 which is rotatably mounted in the housing 10 and is driven through reduction gearing 38 from an electric motor 40. The cam shaft 36 rotates continuously while the machine is in use. Also mounted on the shaft 22, just above the Geneva wheel 30, is a locking disc 31 provided with notches at its periphery and being arranged to co-operate with a pawl 35 carried by a lever 37 fixed within the housing 10, said lever 37 being actuated by a cam 33 to lock the turret in position after each step and release it for the next one.

Each work support 24 of the illustrative towing machine comprises a circular cast aluminium base 42 with a central recess 44 formed in the under-side thereof to receive an upper end portion of a spindle 46 which is tubular over part of its length and on which the base 42 is thus supported. Each work support 24 further comprises an annular rim 48 of flexible rubbery material divided into six segments to provide six gaps which are equally spaced apart about the annular rim 48 and in each of which is mounted a suction cup 50 connected to the central recess 44 formed in the base 42 by means of a passage 52. The spindle 46 of each work support 24 is rotatably mounted in a sleeve 54 carried by an arm 20 of the turret 18, the sleeve 54 also providing an internal annular chamber 56 connected to the central recess 44 formed in the base 42 of the work support 24 by means of a bore 57 formed in the upper portion of the spindle 46 of the work support and the chamber 56 being connected, in turn, through a pipe 58 (FIGURES 1 and 3) to one of four vertical bores 60 in the shaft 22 of the turret. The bores 60 lead to valves 62 (one for each work support) mounted for rotation with the turret and provided with spring-pressed plungers 63 that ride on a vertically displaceable valve-operating plate 64 and thence to a bore 65 and pipe 67 permanently connected to a suction pump (not shown). The plate 64 is mounted on a bracket 66 fixed within the housing 10 and is arranged to be raised and lowered, in the operation of the machine, by a bifurcated arm of a bell-crank lever 68 actuated by a plunger 70 carrying a roll 72 that rides against the periphery of a cam 74 (FIGURE 3) on the cam shaft 36, said plunger 70 being mounted for sliding movement in a slideway in the bracket 66. Lowering of the plate 64 in the operation of the machine allows the plungers 63 riding on it to fall under the influence of the springs to open their valves to exhaust and release any suction to which a workpiece on the corresponding supports may be subjected. At the third, towing, station of the machine it is desired that the suction is kept on, and therefore the plunger 63 of the valve 62 controlling suction to the work support at that station is arranged to ride over a stationary post 76 fixed to the bracket 66 and accommodated in a hole in the plate 64. The top of this post is level with the plate 64 when the plate 64 is in its raised position. Thus, when the plate 64 is lowered, suction is released at the work supports in only three of the stations of the machine.

At the work-centering station 26 of the illustrative towing machine is provided a work-centering device comprising four arms 80 (FIGURES 1 and 2) each of which carries a rubber pad 82 mounted on a vertical pin 84 angularly adjustable in a free end portion of the arm. Each arm 80 is angularly adjustable upon a vertical spindle 86 freely accommodated in a sleeve 88 secured to the head 16 of the machine (there being thus in all four such spindles 86 and four such sleeves 88). Upper end portions of the spindles 86 are received, with freedom to turn about their axes, in bores at the ends of four arms 90 of a spider 92. A collar 94 at the top of each spindle and a lever 96 secured to each spindle below the arm of the spider associated therewith prevent vertical displacement of each spindle relative to its associated spider arm. A splined upper portion 98 (FIGURE 1) of the spider 92 is slidable (without freedom to rotate) in an internally splined collar 99 mounted at the top of the head 16 and is arranged to be raised and lowered, in the operation of the machine, by means of a lever 100 (FIGURES 1 and 2) coupled to the spider by a link 102 and by a rod 104 to one end of a lever 106. The lever 106 is pivoted at its centre to a horizontal pin 108 mounted on a bracket 110 of the housing 10 and at its other end carries a cam roll accommodated on a peripheral track of a cam 114 (FIGURE 1) on the cam shaft 36. Raising of the spider 92 under the control of the cam 114 is assisted by coil springs 116 sourrunding the spindles 86 and acting between the sleeves 88 and levers 96.

Figure 2:
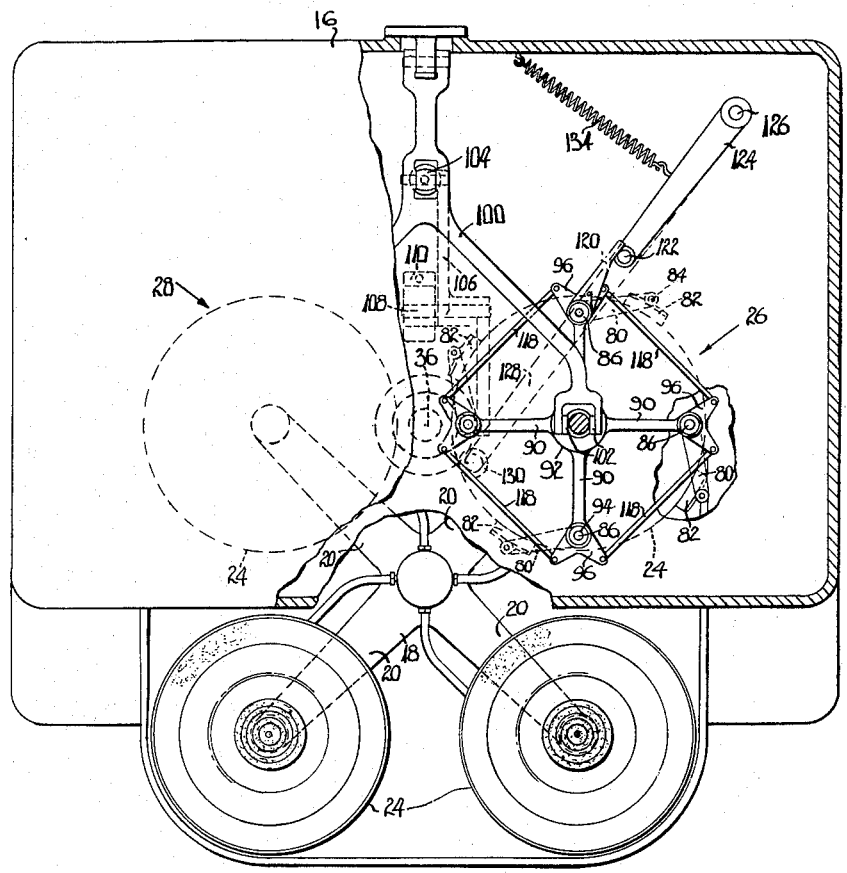
FIGURE 2 shows a plan view, partly in section and with parts broken away, of the towing machine.
Figure 3:
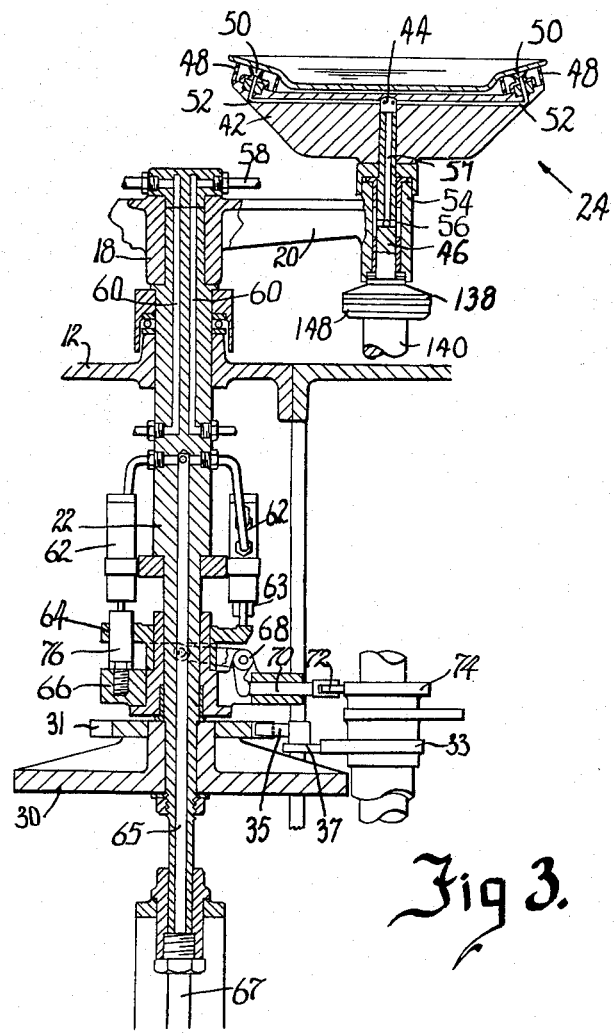
FIGURE 3 shows a sectional view of parts of the towing machine shown in FIGURE 1 indicating more clearly the operation of suction applying means.
Figure 4:
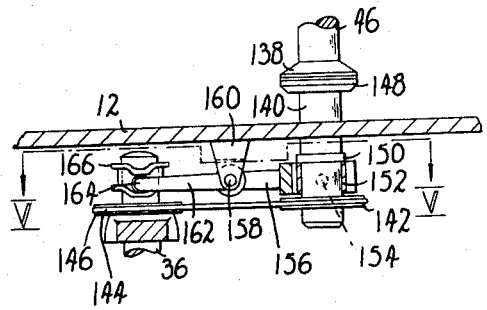
FIGURE 4 shows a fragmentary view along the line IV—IV of FIGURE 1.
Figure 5:
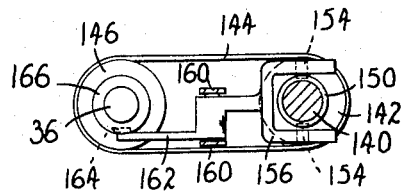
FIGURE 5 is a plan view of the parts shown in FIGURE 4 along the line V—V of FIGURE 4.
Figure 6:
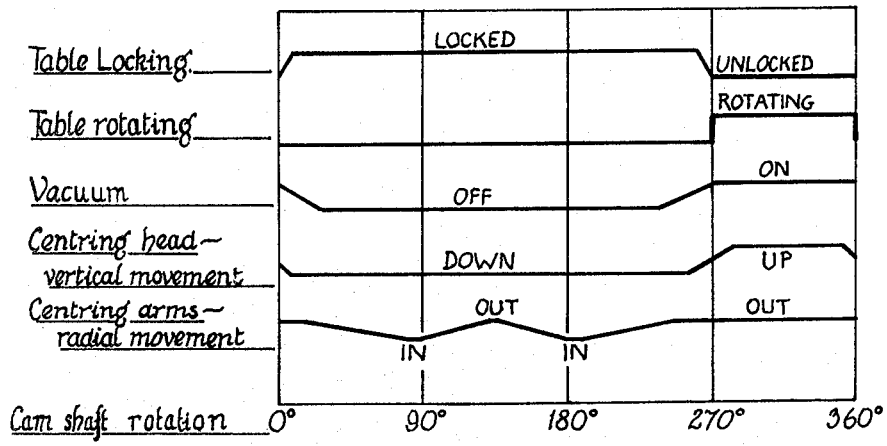
FIGURE 6 is a diagram indicating the relative timing in a cycle of operation of operating parts of the illustrative towing machine.

The levers 96 of the work-centering device of the illustrative towing machine are V-shaped and each arm is pivotally linked to a rod 118 that leads to the nearest arm of the next adjacent lever (see FIGURE 2). Thus turning of one spindle 86 about its axis is accompanied by simultaneous corresponding movement of the other three. One of the levers 96 (the uppermost one in FIGURE 2) has a third arm 120 (FIGURES 1 and 2) that projects into the path of a striker pin 122 upstanding from an arm 124 mounted at the top of a vertical shaft 126 rotatably supported by bearings in the housing 10 and in the head 16 of the machine. At its lower end, the shaft carried an arm 128 (FIGURE 1) provided with a cam roll 130 that bears against the periphery of a cam 132 on the cam shaft 36. A tension spring 134 (FIGURE 2) acting between the arm 124 and a hook on the wall of the head 16 urges the cam roll 130 into contact with the cam 132. A torsion spring 136 (FIGURE 1) acting between a pin on the lever 120 and the spider 92 urges the spindles 86 clockwise (viewing FIGURE 2) and moves them clockwise when permitted to do so by the striker pin 122.

Mounted for rotation in the flat top 12 of the housing 10 of the illustrative towing machine is a vertical drive shaft 140 the axis of which is arranged to lie coincident with the axis of the spindle 46 of the work support 24 positioned at the work centering station of the machine. Fixedly mounted at the lower end of the drive shaft 140 is a pulley 142 operatively connected, by means of a belt 144, to a pulley 146 fixedly mounted at the upper end portion of the cam shaft 36, the arrangement being such that the drive shaft 140 is caused to rotate through one revolution for each revolution of the cam shaft. Secured at the upper end of the drive shaft 140 is a clutch plate 148 arranged to co-operate with a complementary clutch plate 138 formed at the lower end portion of the spindle 46 of each of the work supports 24. The drive shaft 140 is also mounted for limited heightwise movement in the flat top 12 of the housing 10 whereby the clutch plates 138, 148 can be brought into engagement with one another. The drive shaft 140 is formed, intermediate its length, with an integral collar 150 arranged to rest at the upper end of a bush 152 through which the drive shaft 140 passes. The bush 152 is secured by pins 154 in a bifurcated end portion of one arm 156 of a bell crank lever mounted for pivotal movement on a pin 158 supported in two arms of a lug member 160 secured to the under-side of the flat top 12. The other arm 162 of the bell crank lever carries a roll 164 constituting a cam follower arranged to co-operate with a barrel cam 166 fixedly mounted at the upper end portion of the cam shaft 36, the cam 166 being so constructed and arranged that once for each revolution of the cam shaft 36 clutch plates 148, 138 of the drive shaft 140 and spindle 46 respectively are caused to engage whereby to cause the spindle, and thus the work support 24 at the work centering station, to be rotated through about 60°.

In the operation of the illustrative towing machine, the operator loads workpieces to be operated upon on to the work supports 24 as the latter are successively brought to the first, loading, station, workpieces, that have been operated upon being removed from the work supports by the operator at the fourth, unloading, station. The machine operates automatically, sufficient time being allowed for the operator to load and unload workpieces as aforesaid.

The cam shaft 36 rotates continuously and is effective, once during each revolution thereof, to cause the roll 34 to engage with the wheel 30 of the Geneva mechanism, at the same time releasing the locking disc 31, whereby the turret 18 is moved through 90° to bring a fresh workpiece to the work centering station. Prior to the turret being moved, the cam 74 is effective to cause the plate 64 to rise whereby suction is applied to workpieces supported on the work supports at the first, second and fourth stations and also suction is maintained on the workpiece on the work support at the third station so as to ensure that no workpiece is dislodged during the rotation of the turret 18. After the turret has been rotated as aforesaid and locked in position, the plate 64 is allowed to fall by the cam 74, thus relieving the suction at the first, second and fourth stations. At the same time the spider 92 of the work centering device is lowered to bring the pads 82 on the arms 80 down to a level at which they can engage the periphery of the workpiece. Thereafter, the cam 132 rocks the arms 128, 124 to swing the striker pin 122 anticlockwise (viewing FIGURE 2) to allow the arm 120 under the influence of the torsion spring 136 to turn the spindles 86 simultaneously to move the pads 82 inwardly towards the work support 24. In so moving, the pads move the workpiece as necessary to a central position. The cam 132 then allows the arms 128, 124 to rock the other way under the influence of the spring 134 to cause the striker pin 122 to move the lever 120 clockwise (viewing FIGURE 2) and to bring the pads 82 away from the workpiece. Due to the conicity of the margin of the workpiece, if it was not centrally disposed on the work support when first placed there, it will probably have been slightly tilted as it lay on the annular rim 42, with the consequence that after being first moved centrally by the pads 82, still in a tilted posture, it will, on release by the pads, drop into a more level posture on the rim 42, more nearly central than it was, but not as accurately as described for the operation of the towing tool. Under control of the cam 132, the pads now move in once more accurately to position the workpiece on the work support and, while the pads are maintained in engagement with the workpiece, the drive shaft 140 is raised, under the influence of the barrel cam 166, to bring the clutch plates 138, 148 into engagement with one another whereby the work support 24 is caused to rotate through about 60°. The pads are then moved away again, the cam 114 being thereafter effective to cause the spider 92 to be raised, whereby the pads are raised above the level of the workpiece so as not to interfere with its horizontal swinging movement away from the work centering station when next the turret is caused to rotate through 90°.

Whereas the illustrative towing machine referred to above is so constructed and arranged that any residual distortion of the flexible suction cups 50 is relieved by causing the work support 24 at the work centering station of the machine to be rotated through about 60° as aforesaid, in an alternative form of towing machine, which is nevertheless in accordance with the invention, means is provided whereby the workpiece is raised away from the work support 24 at the work centering station of the machine in order to achieve a similar effect, the construction and arrangement of this alternative machine being such that, in the operation thereof, when the pads 82 have engaged the periphery of the workpiece a second time and thus moved the workpiece into a centralised position as aforesaid, the spider 92, and thus also the pads 82 and the workpiece embraced thereby, are raised e.g. by means of the cam 114 suitably modified for this purpose, sufficiently to allow any residual distortion of suction cups 50 to be relieved, the spider being thereafter lowered again whereby the workpiece is placed again in its centralised position on the work support 24.

Having thus described our invention, what we claim as new and desire to secure by Letters Patent of the United States is:

1. A machine for use in the manufacture of pottery ware comprising a work support, flexible work-engaging suction means arranged, when suction is applied, to hold a workpiece on the work support, work centering means arranged to move a workpiece supported on the work support into a centralised position on the work support, and means whereby relative movement is caused to take place between the work support and the workpiece in such a manner as to relieve any residual distortion of the suction means tending to displace the workpiece from its centralised position.

2. A machine according to claim 1 wherein the flexible work-engaging suction means comprises a plurality of suction cups.

3. A machine according to claim 2 wherein the suction cups are spaced apart about the rim of the work support.

4. A machine for use in the manufacture of pottery ware comprising a rotatable work support, flexible work-engaging suction means comprising a plurality of suction cups arranged, when suction is applied, to hold a workpiece on the work support, work centering means arranged to move a workpiece supported on the work support, by engagement with its periphery, into a centralised position on the work support, and means for causing the work support to be rotated, while the workpiece is engaged by the work centering means as aforesaid, whereby to relieve any residual distortion of the suction cups tending to displace the workpiece from its centralised position.

5. A machine according to claim 4 wherein the work support is caused to be rotated through about 60°.

6. A machine for use in the manufacture of pottery ware comprising a work support, flexible work-engaging suction means arranged, when suction is applied, to hold a workpiece on the work support, work centering means comprising a plurality of elements arranged to move a workpiece supported on the work support, by engagement therewith at spaced localities about its periphery, into a centralised position on the work support, and means whereby relative movement is caused to take place between the work support and the workpiece in such a manner as to relieve any residual distortion of the suction means tending to displace the workpiece from its centralised position.

7. A machine for use in the manufacture of pottery ware comprising a work support, flexible work-engaging suction means arranged, when suction is applied, to hold a workpiece on the work support, work centering means comprising a plurality of elements arranged to engage a workpiece supported on the work support, at spaced localities about its periphery, a first time, to release it, and to engage it a second time whereby to move it into a centralised position on the work support, and means whereby, while the workpiece is engaged a second time as aforesaid by the elements of the work centering means, relative movement is caused to take place between the work support and the workpiece in such a manner as to relieve any residual distortion of the suction means tending to displace the workpiece from its centralised position.

8. A machine for use in the manufacture of pottery ware comprising a rotatable work support, flexible work-engaging suction means comprising a plurality of suction cups arranged, when suction is applied, to hold a workpiece on the work support, work centering means comprising a plurality of elements arranged to engage a workpiece supported on the work support, at spaced localities about its periphery, a first time, to release it, and to engage it a second time whereby to move it into a centralised position on the work support, and means for causing the work support to be rotated, while the workpiece is engaged a second time as aforesaid by the elements of the work centering means, whereby to relieve any residual distortion of the suction cups tending to displace the workpiece from its centralised position.

9. A machine for use in the manufacture of pottery ware comprising a turret arrangement operated intermittently, in the operation of the machine, to bring successive workpieces to a work centering station and thereafter to an operating station of the machine, a plurality of rotatable work supports mounted on the turret arrangement, flexible suction means associated with each of the work supports and arranged, when suction is applied, to hold a workpiece on its work support, work centering means comprising a plurality of elements arranged, at the work centering station of the machine, to move a workpiece supported on the work support at that station, by engagement with the workpiece at spaced localities about its periphery, into a centralised position on the work support, and means, operative at the work centering station, when a workpiece supported on the work support at the station is engaged by the work centering means as aforesaid, whereby relative movement is caused to take place between the work support and the workpiece in such a manner as to relieve any residual distortion of the suction means tending to displace the workpiece from its centralised position.

References Cited by the Examiner

UNITED STATES PATENTS

| 1,121,452 | 12/1914 | Bagnall | 51—235 |
| 2,895,205 | 7/1959 | Bentley et al. | 25—24 |
| 2,950,829 | 8/1960 | McBean et al. | 214—1 |
| 3,187,989 | 6/1965 | Barts | 294—64 |

FOREIGN PATENTS

| 71,616 | 4/1916 | Austria. |
| 611,856 | 11/1948 | Great Britain. |
| 970,077 | 9/1964 | Great Britain. |

J. SPENCER OVERHOLSER, *Primary Examiner.*